United States Patent [19]

Hosokawa et al.

[11] Patent Number: 4,527,109
[45] Date of Patent: Jul. 2, 1985

[54] CONTROL APPARATUS FOR THYRISTOR MOTOR

[75] Inventors: Yasuhiko Hosokawa; Naoki Morishima, both of Kobe, Japan

[73] Assignee: Mitsubishi Denki Kabushiki Kaisha, Tokyo, Japan

[21] Appl. No.: 580,180

[22] Filed: Feb. 15, 1984

[30] Foreign Application Priority Data

Feb. 22, 1983 [JP] Japan .................................. 58-29836
Feb. 22, 1983 [JP] Japan .................................. 58-29837

[51] Int. Cl.³ ............................................. H02P 5/40
[52] U.S. Cl. .................................... 318/715; 318/719; 318/723
[58] Field of Search ........ 318/716, 717, 718, 721–723, 318/712–715

[56] References Cited

U.S. PATENT DOCUMENTS 4,172,991 10/1979 Akamatsu et al. ................... 318/722
4,276,505 6/1981 Bose ..................................... 318/717
4,319,176 3/1982 Akamatsu ............................. 318/716

OTHER PUBLICATIONS

Article "Commutatorless DC Drive for Steel Rolling Mill", Shinryo et al., reprinted from IEEE/IAS 1977 Annual Meeting, pp. 263–271, 1977.
Article "Utilization and Rating of Machine Commutated Inverter-Synchronous Motor Drives", John Rosa, reprinted from IEEE Trans. Ind. Appl., vol. IA-15, pp. 155–164, Mar./Apr. 1979.

Primary Examiner—David Smith, Jr.
Attorney, Agent, or Firm—Lowe, King, Price & Becker

[57] ABSTRACT

A control apparatus for thyristor motor comprises a voltage detector (27), a speed detecting circuit (600) and a correction circuit (800). The voltage detector (27) detects DC voltage ($E_d$) supplied to an inverter circuit (200). The speed detecting circuit (600) detects the rotational speed of a synchronous motor (3) and provides speed voltage ($E\omega$) proportional thereto. The correction circuit (800) detects a difference between the detected DC voltage ($E_d$) and the speed voltage ($E\omega$) and provides a correction signal to an excitation circuit (700) when a difference is detected. The excitation circuit (700) corrects field current in response to the correction signal so that the DC voltage ($E_d$) and the speed voltage may be equal. Thus, a proportional relation can be maintained between the instructed torque and the generated torque.

19 Claims, 12 Drawing Figures

CONTROL APPARATUS FOR THYRISTOR MOTOR

BACKGROUND OF THE INVENTION

1. Field of the Invention

The present invention relates to a control apparatus for a thyristor motor and more particularly to a control apparatus for a thyristor motor having a compensation field coil for generating compensation field flux orthogonally intersecting with main field flux so as to compensate armature reaction.

2. Description of the Prior Art

A thyristor motor is a synchronous motor driven by semiconductor commutator means. FIG. 1 is a block diagram showing a conventional control apparatus for a thyristor motor. Although the below described direct current $I_d$, DC voltage $E_d$, main field current $I_f$, compensation field current $I_c$ etc. in a real state and signals for detecting or instructing them do not have the same values, the real values and the signals will be sometimes regarded as the same in the present specification for the purpose of facilitating the explanation. The synchronous motor 3 has armature coils U, V and W and field coils 310 comprised of a main field coil F and a compensation field coil C. The main field coil F generates main field flux and the compensation filed coil C generates compensation field flux orthogonally intersecting with the main field flux. To the rotating axis of the synchronous motor 3, a position sensor 4 and a tachometer generator 6 are connected. The position sensor 4 provides a position signal of a phase according to the rotational angle of the rotating axis of the synchronous motor 3. The tachometer generator 6 generates voltage proportional to the rotational speed of the rotating axis of the synchronous motor 3. A control apparatus for a thyristor motor comprises in rough a power supply circuit 100, an inverter circuit 200, an excitation circuit 70 and a speed instructing circuit 900. The power supply circuit 100 comprises a converter 1, a current detector 9, a current controller 10, a gate pulse phase shifter 11 and a coefficient multiplier 20. The converter 1 converts AC power of a commercial AC power source into DC power. The current detector 9 rectifies AC input current of the converter 1 and provides a signal proportional to the DC current $I_d$ outputted from the converter 1. The coefficient multiplier 20 multiplies, by a predetermined coefficient, an instructed value of torque outputted from a speed controller 8 to be described below so as to provide an instructed value of current for the converter 1. The current controller 10 amplifies a deviation between an output signal of the coefficient multiplier 20 and an output signal of the current detector 9. The gate pulse phase shifter 11 controls an ignition phase of the converter 1 according to the output signal of the current controller 10. The inverter circuit 200 comprises an inverter 2 and a gate amplifier 5. The gate amplifier 5 provides a gate signal to the inverter 2 based on a position signal from the position sensor 4. The inverter 2 commutates the DC power from the power supply circuit 100 in response to the gate signal so as to supply the power to the armature coils U, V and W. The speed instructing circuit 900 comprises a speed instructing device 7 and a speed controller 8. The speed instructing device 7 provides a speed instructing signal for making the rotational speed of the synchronous motor 3 be a predetermined rotational speed. The speed controller 8 examines and amplifies a difference between the speed instructing signal from the speed instructing device 7 and a speed feedback signal from the tachometer generator 6. The excitation circuit 70 comprises a main excitation circuit 71 and a compensation excitation circuit 72. The main excitation circuit 71 comprises a field instructing device 12, a coefficient multiplier 21, an adder 22, a current detector 13, a current controller 14, a gate pulse phase shifter 15 and a converter 16. The field instructing device 12 instructs a no-load value $I_{fo}$ of the main field current $I_f$. The coefficient multiplier 21 multiplies by a predetermined coefficient, an instructed value of torque outputted from the speed controller 8 so as to apply a correction amount $\Delta I_f$ for a demagnetized amount of the main field current $I_f$ in the loaded condition. The adder 22 performs addition of an instructed value of field current outputted from the field instructing device 12 and a correction amount outputted from the coefficient multiplier 21 so as to obtain an instructed value $I_{fp}$ of field current represented by the equation $I_{fp}=I_{fo}+\Delta I_f$. The current detector 13 rectifies the AC input of the converter 16 for control of the main field so as to detect the amount of main field current $I_f$. The current controller 14 amplifies a deviation between the signal $I_{fp}$ and a detected value of current outputted from the current detector 13. The gate pulse phase shifter 15 controls an ignition phase of the thyristor in the converter 16 according to the output of the current controller 14. The converter 16 supplies a main field current $I_f$ in response to a signal from the gate pulse phase shifter 15. The compensation excitation circuit 72 comprises a coefficient multiplier 23, a current detector 17, a current controller 18, a gate pulse phase shifter 19 and a converter 24. The coefficient multiplier 23 multiplies an instructed value of torque outputted from the speed controller by a predetermined coefficient so as to provide instruction of current for compensation field. The current detector 17 rectifies the AC input to the converter 24 for control of compensation field so as to detect the amount of compensation field current $I_c$. The current controller 18 examines and amplifies a difference between an instructed value of compensation filed current outputted from the coefficient multiplier 23 and a detected value of current outputted from the current detector 17. The gate pulse phase shifter 19 supplies ignition pulses to the thyristors in the converter 24 according to the output of the current controller 18. The converter 24 supplies a compensation field current $I_c$ in response to a signal from the gate pulse phase shifter 19.

Now, description will be made of a total operation. The position sensor 4, the gate amplifier 5 and the inverter 2 operate so that the phase of the armature current $I_a$ of the synchronous motor 3 may be a predetermined phase with respect to the rotating phase of the field flux. The tachometer generator 6, the speed instructing device 7 and the speed controller 8 provide instruction of torque so that the rotational speed of the synchronous motor 3 may be equal to the instructed speed. The coefficient multiplier 20 multiplies the instruction of torque by a coefficient determined by various constants of the synchronous motor 3 so as to instruct armature current $I_a$ necessary for generating torque equal to the instructed value. The process in which the direct current $I_d$ is controlled to a predetermine value by the current detector 9, the current controller 10, the gate pulse phase shifter 11 and the converter 1 is well known. The field instructing device 12 supplies a reference value $I_{fo}$ of the main field current in the no-load condition, and this reference value becomes an instructe-d value of current $I_{fp}$ after a field current increment $\Delta I_f$ for correction of a demagnetized amount in the loaded condition is added to the reference value. The process in which the main field current $I_f$ is controlled to be a predetermined value by means of the current detector 13, the current controller 14, the gate pulse phase shifter 15 and the converter 16 is well known. The coefficient multiplier 23 instructs compensation field current $I_c$ necessary for compensation of the armature reaction determined by the constants of the motor. The instructed torque and the armature current $I_a$ are maintained in a proportional relation and the compensation field current $I_c$ and the instructed torque are also maintained in a proportional relation. Accordingly, the armature current $I_a$ and the compensation field current $I_c$ are controlled in proportion to each other. The current detector 17, the current controller 18, the gate pulse phase shifter 19 and the converter 24 control the compensation field current $I_c$ according to the instructed value.

FIG. 2A is a vector diagram showing a relation between the voltage and the current of the FIG. 1 motor in the no-load condition. FIG. 2B is a vector diagram showing a relation between the voltage and the current of the FIG. 1 motor in the loaded condition. The inverter 2 is an external commutated inverter and, therefore, it is necessary to provide current in a leading power factor for commutation. For this reason, the position sensor 4 is disposed in the synchronous motor 3 so that the armature current $I_a$ may flow in the direction advancing by an angle $\gamma$ with respect to the no-load induced voltage $E_o$. In the loaded condition, the armature current $I_a$ causes voltage $X_sI_a$ in the direction shown in FIG. 2B due to the armature reaction. The voltage $X_sI_a$ includes a direct-axis component and a quadrature-axis component. Voltage $X_sI_c$ caused by the compensation field coil is generated in the direction shown in FIG. 2B. This voltage $X_sI_c$ compensates the quadrature component of the armature reaction. If this state continues, the induced voltage V in the loaded condition becomes smaller than the induced voltage $E_o$ in the no-load condition and as a result, a sufficient output of the motor cannot be obtained. For this reason, voltage $X_s \Delta I_f$ is generated by increasing the main field current by an amount $\Delta I_f$, whereby the induced voltage having the same amount as that in the no-load condition can be obtained.

As is understood from the foregoing description, in a conventional control apparatus, a compensation field current $I_c$ and a correction value $\Delta I_f$ of the main field current are made to flow in proportion to the armature current $I_a$ so that the armature reaction may be compensated. In such a method, a precise compensation can be made as far as a vector relation as shown in FIG. 2B is maintained, and since the torque generated in the motor is proportional to the armature current $I_a$, torque control can also be made with precision. However, in reality, it is well known that commutation of the inverter 2 is not provided instantaneously and that an overlapping angle of commutation is caused. As a result, a delay from the determined angle $\gamma$ is caused in the phase of the armature current $I_a$ and this phase delay becomes a significant amount as the frequency (the rotational speed of the motor) becomes high. Furthermore, the larger is the armature current $I_a$, the greater is the phase delay and accordingly, deviation in the vector relation changes according to the change in the instruction of torque.

Thus, the phase $\gamma$ of the armature current changes according to the changes in the rotational speed of the motor or in the armature current and, therefore, the direction of the armature reaction changes. Accordingly, the armature reaction cannot be compensated with precision by applying the compensation field current $I_c$ and the correction value $\Delta I_f$ of the main field current. As a result, deviation is caused both in the amount and in the phase of the induced voltage V in the loaded condition with respect to the no-load induced voltage $E_o$. As described above, a conventional control apparatus has a disadvantage in that a phase relation between the armature current $I_a$ and the induced voltage V cannot be maintained in a loaded condition and accordingly torque cannot be obtained in accordance with the instruction of torque.

SUMMARY OF THE INVENTION

Therefore, a primary object of the present invention is to provide a control apparatus for a thyristor motor in which torque control can be made precisely even if the phase of the armature current is changed due to an overlapping angle of commutation.

Briefly stated, the present invention is a control apparatus for a synchronous motor including armature coils and field coils having a main field coil for generating main field flux and a compensation field coil for generating compensation field flux orthogonally intersecting with the main field flux, and the above stated control apparatus comprises: power supply means for supplying DC power having a certain amount of DC voltage; inverter means for commutating DC power and for supplying it to the armature coils; excitation circuit means for supplying field current to the field coils and for correcting the field current in response to a correction signal applied thereto; voltage detecting means for detecting DC voltage; speed detecting means for detecting the rotational speed of the synchronous motor and for providing speed voltage of an amount having a functional relation with the rotational speed; and a correction means for establishing a correction signal based on a difference between the detected DC voltage and the speed voltage and for applying the signal to the excitation circuit means.

According to the present invention, if a difference is caused between the detected DC voltage and the speed voltage, a correction signal is applied from the correction means to the excitation circuit means. The excitation circuit means corrects the field current in response to a correction signal so that the DC voltage and the speed voltage may be equal. Thus, the DC voltage is controlled to be always equal to the speed voltage. Therefore, according to the present invention, it was ascertained that a proportional relation can be maintained between the instructed torque and the generated torque.

A principal advantage of the present invention is that a proportional relation can be maintained between the instructed torque and the generated torque even if the phase of the armature current changes by the influence of an overlapping angle of commutation, whereby torque control can be made precisely.

Another advantage of the present invention is that since the DC voltage can be maintained to a predetermined value, the rated voltage of the power supply means and the inverter means can be made small.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
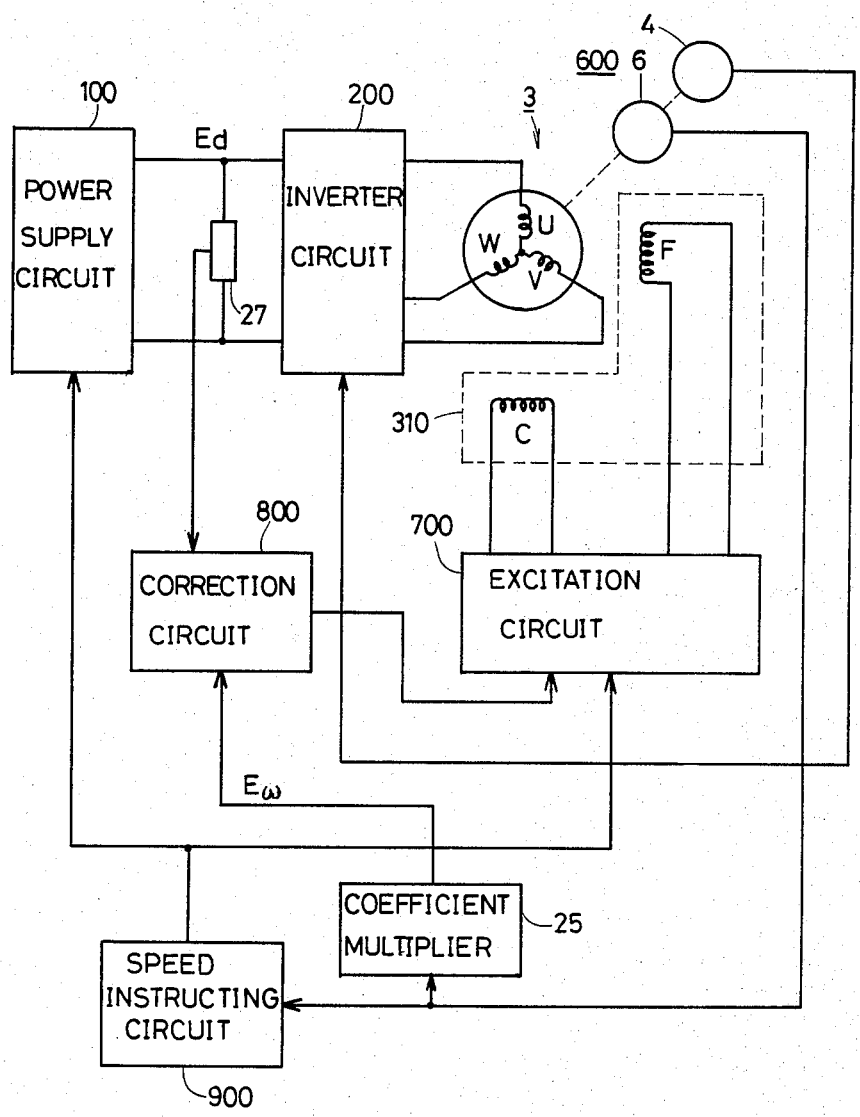
FIG. 3 is a block diagram showing an embodiment of the present invention.

FIG. 3 is a block diagram showing an embodiment of the present invention. A synchronous motor 3 comprises armature coils U, V and W and field coils 310 having a main field coil F for generating main field flux and a compensation coil C for generating compensation field flux orthogonally intersecting with the main field flux. The synchronous motor 3 is connected with a position sensor 4 for providing a position signal of a phase according to the rotational angle of the rotating axis of the motor. The control apparatus comprises a power supply circuit 100, an inverter circuit 200, an excitation circuit 700, a voltage detector 27, a speed detecting circuit 600 and a correction circuit 800. The power supply circuit 100 supplies DC power having a certain amount of DC voltage $E_d$. The inverter circuit 200 is connected to the power supply circuit 100 and the armature coils U, V and W and serves to supply the DC power from the power supply circuit 100 to the armature coils U, V and W after commutation based on the position signal from the position sensor 4. The excitation circuit 700 is connected to the field coils 310 and serves to supply field current to the field coils 310 and to correct the field current in response to a correction signal applied thereto. The voltage detector 27 is connected to the power supply circuit 100 and serves to detect the DC voltage $E_d$. The speed detecting circuit 600 comprises a tachometer generator 6 coupled to the synchronous motor 3 and a coefficient multiplier 25 connected to the tachometer generator 6 and serves to detect rotational speed of the synchronous motor 3 and to generate speed voltage $E_\omega$ of an amount having a certain functional relation with the rotational speed. The correction circuit 800 is connected to the excitation circuit 700, the voltage detector 27 and the speed detecting circuit 600 and serves to establish the above described correction signal based on a difference between the detected DC voltage $E_d$ and the speed voltage $E_\omega$ and to apply the signal to the excitation circuit 700. In the following, the block diagram in FIG. 3 will be described in detail.

Figure 1:
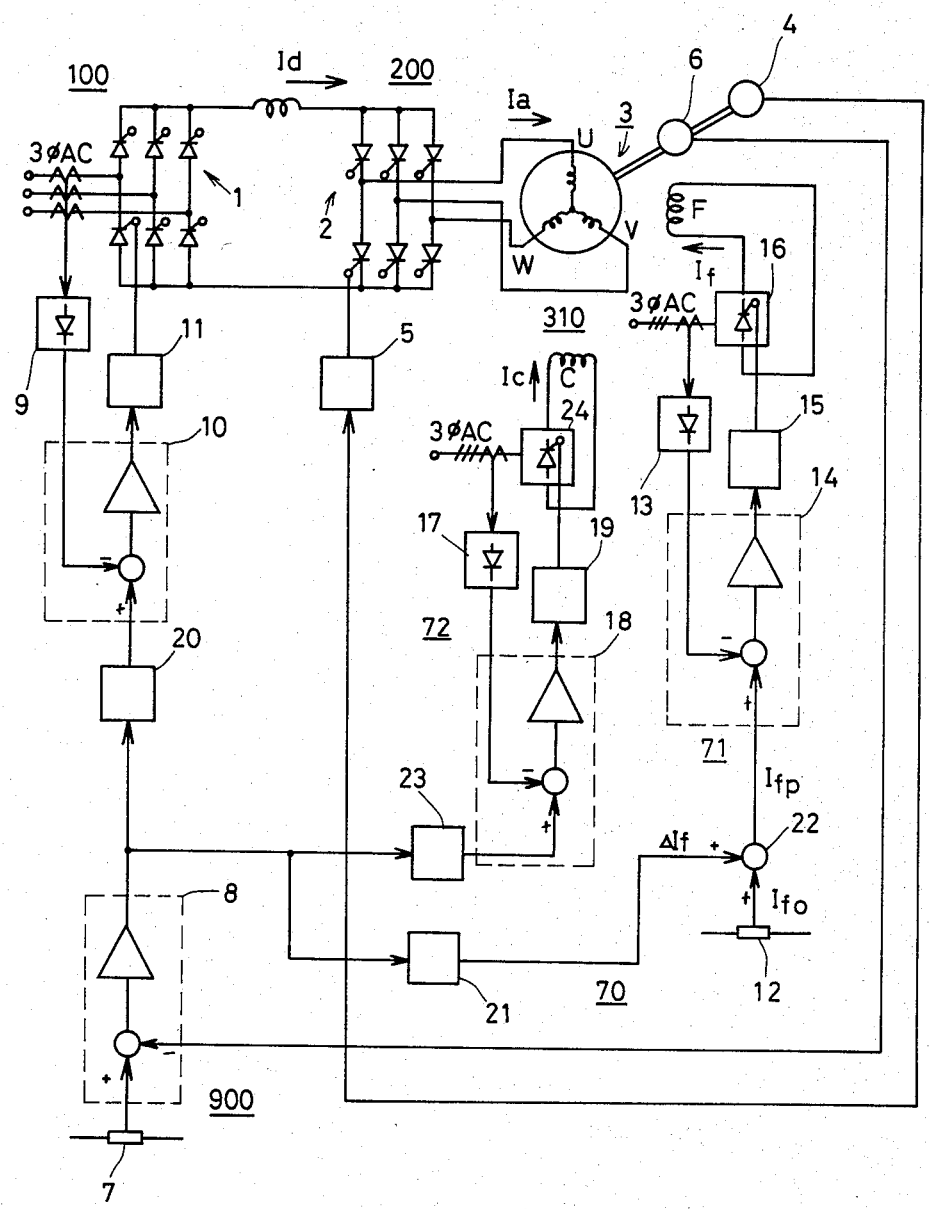
FIG. 1 is a block diagram showing a conventional control for a thyristor motor.
Figure 2A:
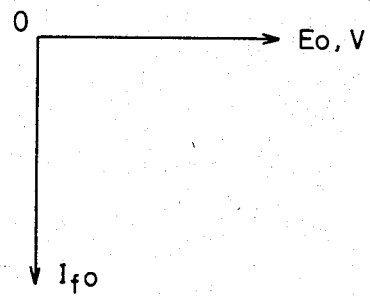
FIG. 2A is a vector diagram showing a relation between the voltage and the current of a motor in FIG. 1 in the no-load condition.
Figure 2B:
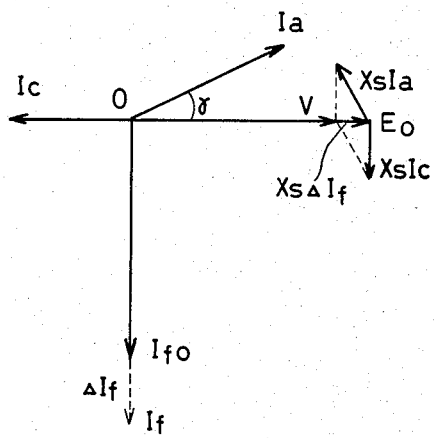
FIG. 2B is a vector diagram showing a relation between the voltage and the current of the FIG. 1 motor in the loaded condition.
Figure 4:
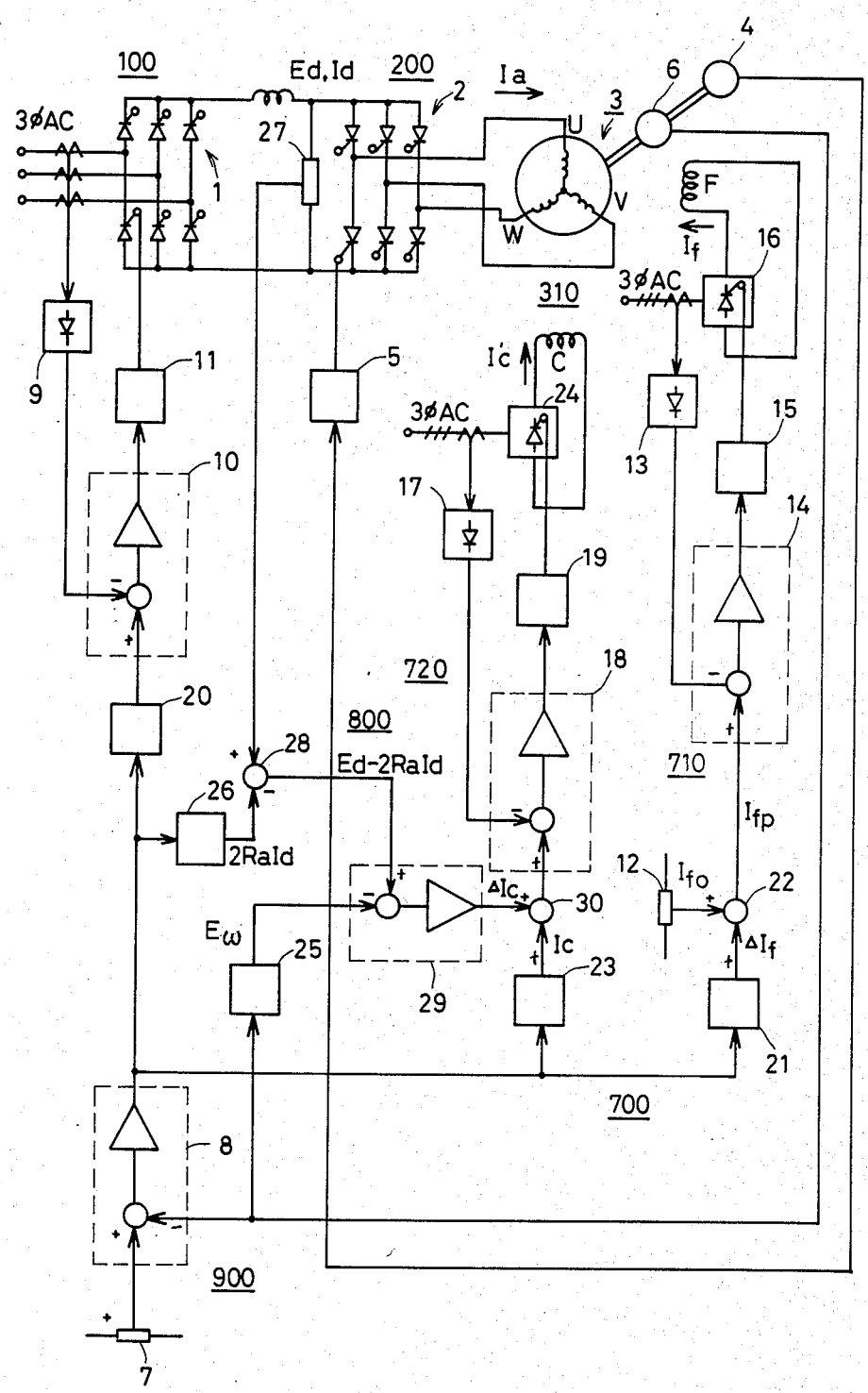
FIG. 4 is a block diagram showing the first embodiment of the present invention.

FIG. 4 is a block diagram showing the first embodiment of the present invention. The power supply circuit 100, the inverter circuit 200, the tachometer generator 6, the position sensor 4 and the speed instructing circuit 900 shown in this block diagram are respectively the same as those in FIG. 1 and therefore, description thereof is omitted. The excitation circuit 700 comprises a main excitation circuit 710 and a compensation excitation circuit 720. The main excitation circuit 710 is the same as the main excitation circuit 71 in FIG. 1, while the compensation excitation circuit 720 is different from the compensation excitation circuit 72 in FIG. 1 in that the circuit 720 has an adder 30. The coefficient multiplier 25 multiplies, by a predetermined coefficient, the voltage proportional to the rotational speed of the synchronous motor 3 outputted from the tachometer generator 6 and provides an output as speed voltage $E_\omega$, whereby a reference DC voltage at no-load is provided. The correction circuit 800 comprises a coefficient multiplier 26, a subtractor 28 and a DC voltage controller 29. The coefficient multiplier 26 multiplies the instruction of torque outputted from the speed controller 8 by a predetermined coefficient and provides voltage corresponding to the voltage drop in the armature coils. The subtractor 28 subtracts the output voltage of the coefficient multiplier 26 from the DC voltage detected by the voltage detector 27. The DC voltage controller 29 amplifies a deviation obtained by subtracting the speed voltage outputted from the coefficient multiplier 25 from the DC voltage outputted from the subtractor 28 and provides a correction signal $\Delta I_c$ of the compensation field. The adder 30 makes addition of the instructed value $I_c$ of compensation field current outputted from the coefficient multiplier 23 and the correction signal $\Delta I_c$ outputted from the DC voltage controller 29 so as to obtain a new instructed value $I_c'$.

The torque generated by the synchronous motor 3 is proportional to the value obtained by dividing, by the rotational speed, the electric power after subtraction of copper loss from the input power. On the other hand, the input of the motor is equal to the DC input of the inverter 2. Assuming that the DC voltage is $E_d$, the DC current is $I_d$, the rotational angular speed of the motor is $\omega$, and the resistance for one phase of the armature coil is $R_a$, the generated torque T is represented by the following equation.

$$T = \frac{1}{\omega}(E_d I_d - 2R_a I_d^2) \quad (1)$$

By transposing the above described equation, the following equation is obtained.

$$T = \frac{1}{\omega} I_d(E_d - 2R_a I_d) \quad (2)$$

From the equation (2), it can be understood that the rotational speed $\omega$ and the voltage $(E_d - 2R_a I_d)$ are controlled to be in a proportional relation in order that torque may be generated in proportion to the DC current $I_d$.

The tachometer generator 6, the coefficient multiplier 25 and the correction circuit 800 in FIG. 4 constitutes a feedback control system for correcting the compensation field current so as to maintain the above described proportional relation. More specifically, the coefficient multiplier 25 generates speed voltage $E_\omega$ proportional to the rotational speed $\omega$; the voltage detector 27 detects DC voltage $E_d$; coefficient multiplier 26 calculates voltage $2R_a I_d$; and the subtractor 28 calculates voltage $(E_d - 2R_a I_d)$. The DC voltage controller 29 compares the voltage $(E_d - 2R_a I_d)$ with the speed voltage $E_\omega$ and provides a correction signal $\Delta I_c$ in a direction for increasing the compensation field current $I_c'$ if the voltage $(E_d - 2R_a I_d)$ becomes larger than the speed voltage $E_\omega$, and provides a correction signal $\Delta I_c$ in a direction for decreasing the compensation field current $I_c'$ if the voltage $(E_d - 2R_a I_d)$ becomes smaller than $E_\omega$ reversely. As a result, the compensation field current $I_c'$ changes so that the DC voltage $E_d$ may change to cause the output of the subtractor 28 to be always equal to the output of the coefficient multiplier 25. Such operation will be described in further detail with reference to the vector diagrams.

Figure 5A:
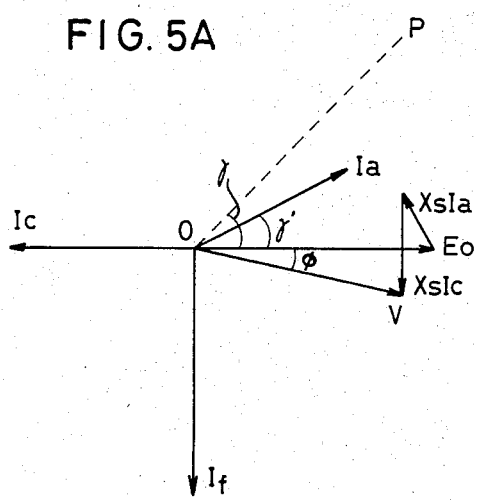
FIG. 5A is a vector diagram for explaining the operation of the FIG. 4 embodiment.
Figure 5B:
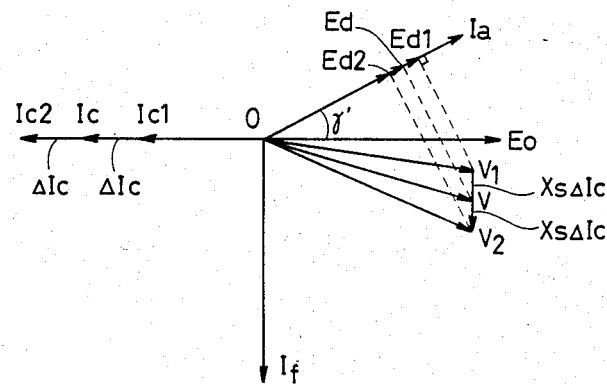
FIG. 5B is a vector diagram showing a process where the compensation field current is regulated in the FIG. 4 embodiment.

FIG. 5A is a vector diagram for explaining the operation in the FIG. 4 embodiment. FIG. 5B is a vector diagram showing a process where the compensation field current is regulated. Referring to FIG. 5A, a line OP shows a reference phase $\gamma$ of an armature current vector $I_a$ determined by a position signal from the position sensor 4. In reality, the armature current flows in a phase $\gamma'$ with a little delay from the reference phase due to an overlapping angle of commutation. As a result, a phase difference between the no-load induced voltage $E_o$ and the armature current $I_a$ becomes small and the power factor becomes good and accordingly, the generated torque becomes larger than the instructed torque. However, if it is assumed that the compensation field current $I_c$ having a little larger amount than a predetermined value flows as shown in FIG. 5A, voltage $X_s I_c$ generated by the action of the compensation field coil causes the phase of the induced voltage V to be delayed by $\theta$ and as a result the power factor can be returned to the original state. Therefore, it is understood that by changing the compensation field current the power factor can be regulated and accordingly the torque generated by the motor can also be regulated.

Referring to FIG. 5B, if the armature resistance $R_a$ is disregarded for the purpose of facilitating the explanation and assuming that an angle formed by the induced voltage V and the armature current $I_a$ is $\theta$, the DC voltage $E_d$ is represented by the following equation.

$$E_d = \frac{3\sqrt{2}}{\pi} V\cos\theta = 1.35\, V\cos\theta \tag{3}$$

where $\cos\theta$ indicates a power factor. This equation (3) indicates that the DC voltage $E_d$ is proportional to a component of the $I_a$ direction in the vector V of the induced voltage. In FIG. 5B, it is assumed that the DC voltage for generating a desired torque is $E_d$, the induced voltage at this time is V and the compensation field current is $I_c$. Now let us assume a case where the compensation field current instructed from the coefficient multiplier 23 is $I_{c1}$ which is smaller than $I_c$. In this case, the voltage $X_s I_{c1}$ becomes smaller than the voltage $X_s I_c$ and accordingly, the induced voltage becomes $V_1$. As a result, the DC voltage is increased to the voltage $E_{d1}$ which is an $I_a$ direction component of the induced voltage $V_1$. Although, in reality, the vector direction of the armature current $I_a$ slightly changes since the overlapping angle of commutation is slightly changed, such slight change is disregarded in this case for the purpose of facilitating the explanation. In consequence, the output of the subtractor 28 becomes larger than the output of the coefficient multiplier 25 and the DC voltage controller 29 provides a positive output $+\Delta I_c$, which is added to the current $I_{c1}$ by the adder 30, so that the compensation field current is regulated to the correct value $I_c$. On the contrary, if the compensation field current instructed from the coefficient multiplier 23 is $I_{c2}$ which is larger than $I_c$, the induced voltage becomes $V_2$. Consequently, the DC voltage is decreased to $E_{d2}$ and the output of the subtractor 28 becomes smaller than the output of the coefficient multiplier 25 and the DC voltage controller 29 provides a negative output $-\Delta I_c$, which is added to the current $I_{c2}$ by the adder 30, whereby the compensation field current is brought back to the correct value $I_c$ also in this case.

Thus, the voltage $(E_d - 2R_a I_d)$ outputted from the subtractor 28 is controlled to be always equal to the speed voltage $E_\omega$ outputted from the coefficient multiplier 25, and accordingly, torque T is proportional to the DC current $I_d$, as is clear from the equation (2). More specifically, even if the vector of the armature current is changed due to an overlapping angle of commutation, the generated torque becomes proportional to the instructed torque and accordingly, the precision of torque control is improved. In addition, since a surplus amount of compensation field current is caused to flow when the overlapping angle of commutation becomes large, the margin time of commutation can be increased effectively.

Figure 6:
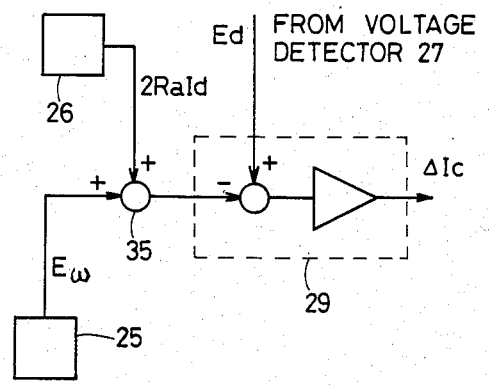
FIG. 6 is a block diagram partially showing an embodiment in which resistance drop voltage is added to the speed voltage.

Although in the FIG. 4 embodiment, a value obtained by subtraction of the voltage $2R_a I_d$ corresponding to a resistance drop from a detected value $E_d$ of DC voltage is compared with speed voltage $E_\omega$, it goes without saying that the same result as in the case of FIG. 4 can be obtained if comparison is made between a value obtained by adding the voltage $2R_a I_d$ corresponding to a resistance drop to the speed voltage $E_\omega$ and the detected value $E_d$ of DC voltage, as shown in FIG. 6.

Figure 7:
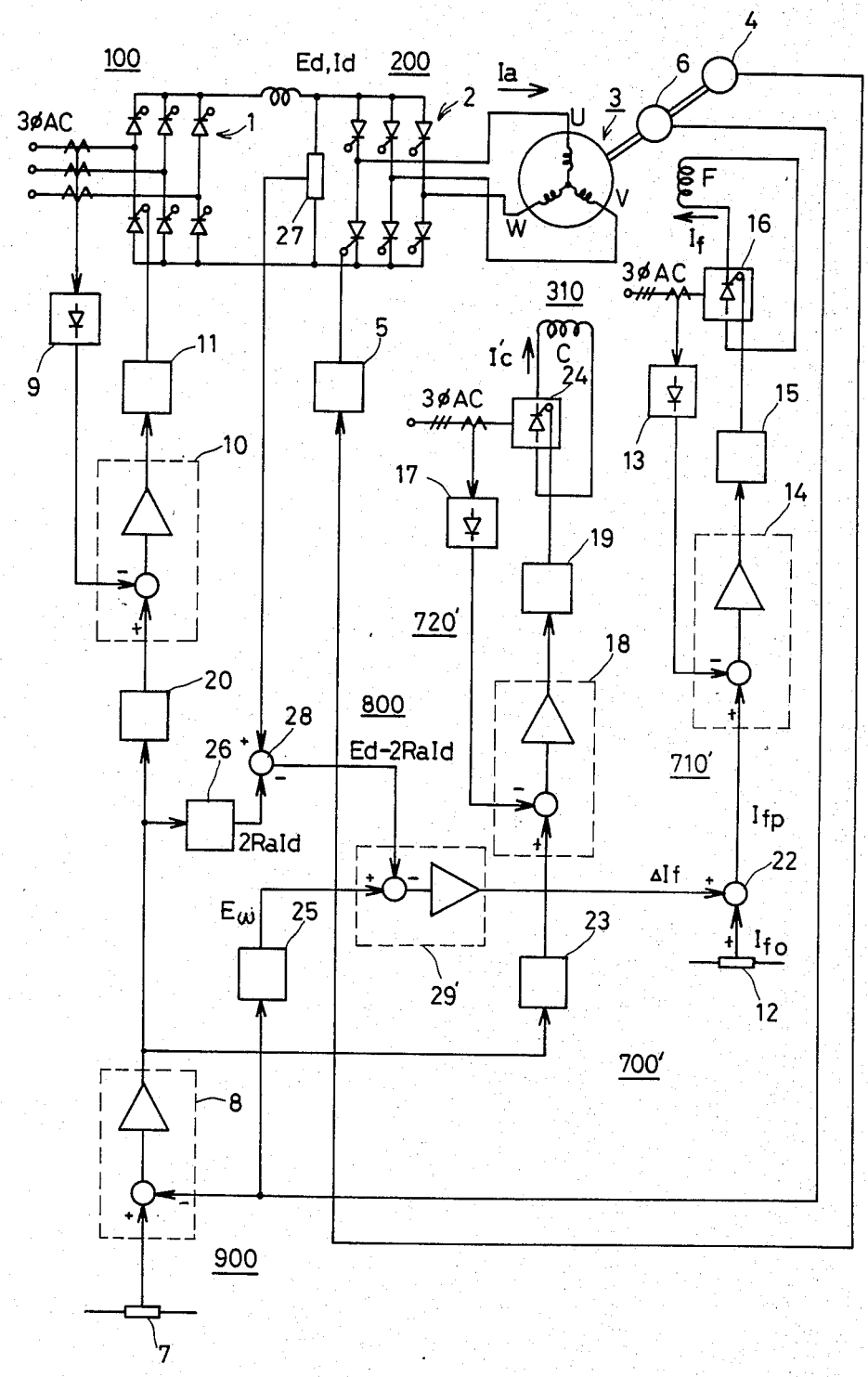
FIG. 7 is a block diagram showing the second embodiment of the present invention.

Instead of the above described embodiment where the compensation field current is corrected, an embodiment where the main field current is corrected will be described in the following. FIG. 7 is a block diagram showing the second embodiment of the present invention. In the following, differences from the block diagram in FIG. 4 will be mainly described. The DC voltage controller 29' in the correction circuit 800 amplifies a deviation obtained by subtracting the voltage $(E_d - 2R_a I_d)$ outputted from the subtractor 28 from the speed voltage $E_\omega$ outputted from the coefficient multiplier 25 and provides a correction signal $\Delta I_f$ of the main field. The excitation circuit 700' comprises a main excitation circuit 710' and a compensation excitation circuit 720'. The adder 22 in the main excitation circuit 710' performs addition of the instructed value $I_{fo}$ of main field current outputted from the field instructing device 12 and the correction signal $\Delta I_f$ outputted from the DC voltage controller 29' so as to provide a new instructed value $I_{fp}$. The DC voltage controller 29' compares the voltage ($E_d - 2R_aI_d$) from the subtractor 28 with the speed voltage $E_\omega$ from the coefficient multiplier 25 and if the voltage ($E_d - 2R_aI_d$) becomes smaller than $E_\omega$, the controller 29′ provides a correction signal $\Delta I_f$ in a direction for increasing the main field current and if the voltage ($E_d - 2R_aI_d$) becomes larger than $E_\omega$, reversely, it provides a correction signal $\Delta I_f$ in a direction for decreasing the main field current. As a result, the DC voltage $E_d$ changes and control is made so that the output of the subtractor 28 may be always equal to the output of the coefficient multiplier 25. This operation will be further described with reference to the vector diagrams.

Figure 8A:
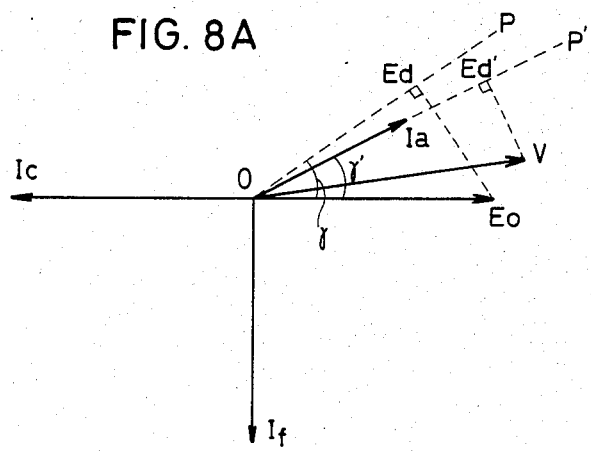
FIG. 8A is a vector diagram for explaining the operation of the FIG. 7 embodiment.
Figure 8B:
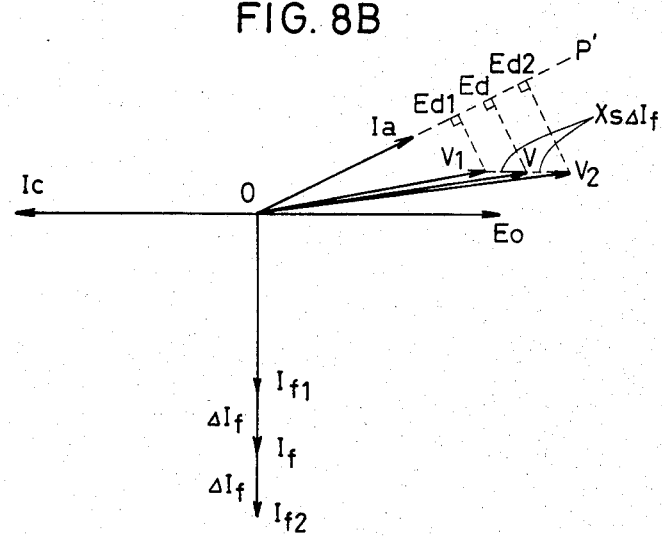
FIG. 8B is a vector diagram showing a process where the main field current is regulated in the FIG. 7 embodiment.

FIG. 8A is a vector diagram for explaining the operation in the FIG. 7 embodiment. FIG. 8B is a vector diagram showing a process where the main field current is regulated. These figures correspond respectively to FIGS. 4A and 4B. Referring to FIG. 8A, a line OP indicates a reference phase $\gamma$ of an armature current vector $I_a$ determined by a position signal of the position sensor 4. In reality, due to an overlapping angle of commutation, current $I_a$ flows in a phase $\gamma'$ having a small delay from the reference phase $\gamma$. As a result, a phase difference between the induced voltage V and the armature current $I_a$ becomes small and the power factor is improved. Accordingly, the generated torque becomes larger than the instructed torque. Also in this case, the armature resistance $R_a$ is disregarded for the purpose of facilitating the explanation, and if an angle formed by the induced voltage V and the armature current $I_a$ is assumed to be $\vartheta$, the above described equation (3) is established. Accordingly, based on the above described equation (2), the amount of generated torque changes in proportion to the $I_a$ direction component of the induced voltage V.

Referring to FIG. 8B, it is assumed that the DC voltage for generating a desired torque is $E_d$, the induced voltage at this time is V and the main field current is $I_f$. Assuming that the main field current instructed from the field instructing device 12 is $I_{f1}$, which is smaller than $I_f$, the induced voltage becomes $V_1$ since the voltage $X_sI_{f1}$ becomes smaller than the voltage $X_sI_f$. As a result, the DC voltage is decreased to $E_{d1}$ which is an $I_a$ direction component of the voltage $V_1$. Although in reality, the vector direction of the armature current $I_a$ changes slightly since an overlapping angle of commutation changes slightly, such change will be disregarded in the explanation for the purpose of facilitating it. In consequence, the output of the subtractor 28 becomes smaller than the output of the coefficient multiplier 25 and the DC voltage controller 29′ provides a positive output $+\Delta I_f$. This positive output is added to the instructed value $I_{fo}$ by the adder 22, so that the main field current is regulated to the correct value $I_f$. Reversely, if the main field current instructed from the field instructing device 12 is $I_{f2}$ which is larger than $I_f$, the induced voltage becomes $V_2$. As a result, the DC voltage is increased to $E_{d2}$. Accordingly, the output of the subtractor 28 becomes larger than the output of the coefficient multiplier 25 and the DC voltage controller 29′ provides a negative output $-\Delta I_f$. This negative output is added to the instructed value $I_{fo}$ by the adder 22 and as a result, the main field current $I_f$ is regulated to the correct value also in this case.

Also in this embodiment, since the voltage ($E_d - 2R_aI_d$) which is an output of the subtractor 28 is controlled so as to be always equal to the speed voltage $E_\omega$ which is an output of the coefficient multiplier 25, the torque T is proportional to the direct current $I_d$, as is clearly understood from the above described equation (2). More specifically, even if the vector of the armature current changes under the influence of an overlapping angle of commutation, the generated torque becomes proportional to the instructed torque and thus, the precision of torque control is improved. In addition, since the DC voltage $E_d$ is maintained to a predetermined value, there is an advantage that the rated voltage of the converter 1 and the inverter 2 can be made small.

Figure 9:
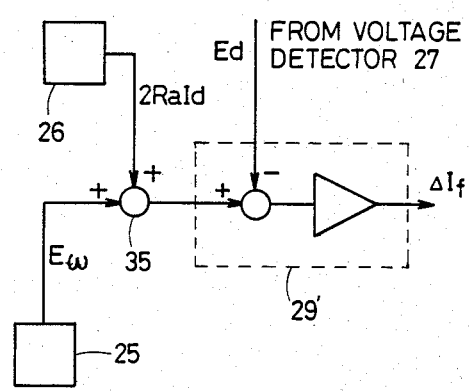
FIG. 9 is a block diagram partially showing an embodiment in which resistance drop voltage is added to the speed voltage.

Although in the FIG. 7 embodiment, a value obtained by subtracting, from the detected value $E_d$ of the DC voltage, the voltage $2R_aI_d$ corresponding to a resistance drop is compared with the speed voltage $E_\omega$, it is the same with the comparison between a value obtained by adding the voltage $2R_aI_d$ to the speed voltage $E_\omega$ and the DC voltage $E_d$, as shown in FIG. 9.

Although in the foregoing description, an instructed value of torque outputted from the speed controller 8 was used for the purpose of obtaining the voltage corresponding to a resistance drop, the same control can be made if an instructed value of current outputted from the coefficient multiplier 20 or a detected value of current outputted from the current detector 9 is used instead of the instructed value of torque. In case where a high precision of control is not required, it is not needed to apply the voltage $2R_aI_d$ corresponding to a resistance drop. In addition, in order to make field-weakening control in a high speed region, the output from the coefficient multiplier 25 is made to be proportional to the rotational speed of the motor 3 in a region not attaining the field-weakening control region and is made constant in the field-weakening region.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for a synchronous motor (3) including armature coils (U, V and W) and field coils (310) having a main field coil (F) for generating main field flux and a compensation field coil (C) for generating compensation field flux orthogonally intersecting with said main field flux, comprising:

power supply means (100) for supplying direct current power having a certain amount of direct current voltage ($E_d$), inverter means (200) connected to said power supply means (100) and said armature coils (U, V and W) for supplying said direct current power to said armature coils (U, V and W) through commutation, excitation circuit means (700) connected to said field coils (310) for supplying field current to said field coils (310) and for correcting said field current in response to a correction signal applied thereto, voltage detecting means (27) connected to said power supply means (100) for detecting said direct current voltage ($E_d$), speed detecting means (600) coupled to said synchronous motor (3) for detecting the rotational speed of said synchronous motor (3) and for generating speed voltage ($E_\omega$) of an amount having a certain functional relation with said rotational speed, and correcting means (800) connected to said excitation circuit means (700), said voltage detecting means

(27) and said speed detecting means (600) for establishing said correction signal based on a difference between said detected direct current voltage ($E_d$) and said speed voltage ($E_\omega$) and for applying said correction signal to said excitation circuit means (700).

2. A control apparatus in accordance with claim 1, wherein said certain functional relation is a proportional relation.

3. A control apparatus in accordance with claim 2, wherein said excitation circuit means (700) comprises:
  a main excitation circuit means (710) connected to said main field coil (F) for supplying main field current to said main field coil (F), and
  a compensation excitation circuit means (720) connected to said compensation field coil (C) for supplying compensation field current to said compensation field coil (C) and for correcting said compensation field current in response to said correction signal.

4. A control apparatus in accordance with claim 3, wherein
  said correcting means (800) comprises first subtraction means (29) for subtracting said speed voltage ($E_\omega$) from said direct current voltage ($E_d$) so as to establish said correction signal, and
  said compensation excitation circuit means (720) operates in response to said correction signal applied from said first subtraction means (29) to increase said compensation field current if said correction signal is positive and to decrease said compensation field current if said correction signal is negative.

5. A control apparatus in accordance with claim 4, wherein
  said correcting means (800) further comprises second subtraction means (26 and 28) connected to said power supply means (100) and said voltage detecting means (27) and for obtaining voltage $E_x$ represented by the following equation:

$$E_x = E_d - 2R_a I_d$$

where $E_d$ is said direct current voltage, $R_a$ is resistance for one phase of said armature coils (U, V and W) and $I_d$ is direct current provided from said power supply means (100),
  said first subtraction means (29) subtracts said speed voltage ($E_\omega$) from said voltage $E_x$ so as to establish said correction signal.

6. A control apparatus in accordance with claim 5, wherein said second subtraction means (26 and 28) comprises:
  a first coefficient multiplier (26) connected to said power supply means (100) for obtaining said value $2R_a I_d$, and
  a subtractor (28) connected to said voltage detecting means (27) and said first coefficient multiplier (26) for obtaining said voltage $E_x$.

7. A control apparatus in accordance with claim 4, wherein
  said correcting means (800) further comprises addition means (26 and 35) connected to said power supply means (100) and said speed detecting means (600) and for obtaining voltage $E_y$ represented by the following equation:

$$E_y = E_\omega + 2R_a I_d$$

where $E_\omega$ is said speed voltage, $R_a$ is resistance for one phase of said armature coils (U, V and W) and $I_d$ is direct current provided from said power supply means (100), and
  said first subtraction means (29) subtracts said voltage $E_y$ from said direct current voltage ($E_d$) so as to establish said correction signal.

8. A control apparatus in accordance with claim 7, wherein said addition means (26 and 35) comprises:
  a first coefficient multiplier (26) connected to said power supply means (100) for obtaining said value $2R_a I_d$, and
  an adder (35) connected to said speed detecting means (600) and said first coefficient multiplier (26) for obtaining said voltage $E_y$.

9. A control apparatus in accordance with claim 2, wherein said speed detecting means (600) comprises:
  a tachometer generator (6) coupled to said synchronous motor (3) for generating voltage proportional to the rotational speed of said synchronous motor (3), and
  a second coefficient multiplier (25) connected to said tachometer generator (6) for multiplying said voltage from said tachometer generator (6) by a predetermined coefficient so as to supply said speed voltage ($E_\omega$).

10. A control apparatus in accordance with claim 2, wherein said excitation circuit means (700) comprises:
  a main excitation circuit means (710') connected to said main field coil (F) for supplying main field current to said main field coil (F) and for correcting said main field current in response to said correction signal, and
  a compensation excitation circuit means (720') connected to said compensation field coil (C) for supplying compensation field current to said compensation field coil (C).

11. A control apparatus in accordance with claim 10, wherein
  said correcting means (800) comprises third subtraction means (29') for subtracting said direct current voltage ($E_d$) from said speed voltage ($E_\omega$) so as to establish said correction signal, and
  said main excitation circuit means (710') operates in response to said correction signal applied from said third subtraction means (29') to increase said main field current if said correction signal is positive and to decrease said main field current if said correction signal is negative.

12. A control apparatus in accordance with claim 11, wherein
  said correcting means (800) further comprises second subtraction means (26 and 28) connected to said power supply means (100) and said voltage detecting means (27) and for obtaining voltage $E_x$ represented by the following equation:

$$E_x = E_d - 2R_a I_d$$

where $E_d$ is said direct current voltage, $R_a$ is resistance for one phase of said armature coils (U, V and W) and $I_d$ is direct current provided from said power supply means (100), and
  said third subtraction means (29') subtracts said voltage $E_x$ from said speed voltage ($E_\omega$) so as to establish said correction signal.

13. A control apparatus in accordance with claim 12, wherein said second subtraction means (26 and 28) comprises:
- a first coefficient multiplier (26) connected to said power supply means (100) for obtaining said value $2R_aI_d$, and
- a subtractor (28) connected to said voltage detecting means (27) and said coefficient multiplier (26) for obtaining said voltage $E_x$.

14. A control apparatus in accordance with claim 11, wherein
said correcting means (800) further comprises addition means (26 and 35) connected to said power supply means (100) and said speed detecting means (600) and for obtaining voltage $E_y$ represented by the following equation:

$$E_y = E_\omega + 2R_aI_d$$

where $E_\omega$ is said speed voltage, $R_a$ is resistance for one phase of said armature coils (U, V and W) and $I_d$ is direct current provided from said power supply means (100), and
said third subtraction means (29') subtracts said direct current voltage ($E_d$) from said voltage Ey so as to establish said correction signal.

15. A control apparatus in accordance with claim 14, wherein said addition means (26 and 35) comprises:
- a first coefficient multiplier (26) connected to said power supply means (100) for obtaining said value $2R_aI_d$, and
- an adder (35) connected to said speed detecting means (600) and said first coefficient multiplier (26) for obtaining said voltage $E_y$.

16. A control apparatus for a synchronous motor (3) including armature coils (U, V and W) and field coils (310) having a main field coil (F) for generating main field flux and a compensation field coil (C) for generating compensation field flux orthogonally intersecting with said main field flux, comprising:
- power supply means (100) for supplying direct current power having a certain amount of direct current voltage ($E_d$) and DC current ($I_d$),
- inverter means (200) connected to said power supply means (100) and said armature coils (U, V and W) for supplying said direct current power to said armature coils (U, V and W) through commutation,
- excitation circuit means (700) connected to said field coils (310) for supplying field current to said field coils (310) and for correcting said field curent in response to a correction signal applied thereto,
- voltage detecting means (27) connected to said power supply meens (100) for detecting said direct current voltage ($E_d$),
- speed detecting means (600) coupled to said synchronous motor (3) for detecting the rotational speed of said synchronous motor (3) and for generating speed voltage ($E_\omega$) of an amount having a certain functional relation with said rotational speed, and
- correcting means (800) connected to said excitation circuit means (700), said voltage detecting means (27) and said speed detecting means (600) for eliminating dependence of torque generated by said motor on said DC voltage ($E_d$) and for providing dependence of said generated torque only on said DC current ($I_d$) component of said DC power supplied thereto.

17. A control apparatus in accordance with claim 16 wherein said correcting means includes means for causing said speed voltage to be a specified function of a difference between said detected DC voltage and an armature voltage drop caused by said DC current flowing therethrough.

18. A control apparatus in accordance with claim 17 wherein said means for causing said speed voltage to be a specified function of said difference includes proportional means for causing said speed voltage to be proportional to said difference.

19. A control apparatus in accordance with claim 18 wherein said excitation circuit means comprises a main excitation circuit connected to said main field coil for supplying main field current thereto,
- a compensation excitation circuit connected to said compensation field coil for supplying compensation field current thereto, and
- wherein said correcting means comprises means for generating said correction signal as a difference between said detected DC voltage and said speed voltage and for supplying said correction signal to one of said main excitation circuit or said compensation excitation circuit.

* * * * *